United States Patent
Makuuchi et al.

(10) Patent No.: US 8,000,045 B2
(45) Date of Patent: Aug. 16, 2011

(54) INSPECTION APPARATUS AND INSPECTION METHOD OF MAGNETIC DISK OR MAGNETIC HEAD

(75) Inventors: Masami Makuuchi, Yokohama (JP); Masayoshi Takahashi, Yokohama (JP); Yoshihiro Sakurai, Hadano (JP); Hideki Mochizuki, Ninomiya (JP)

(73) Assignee: Hitachi High-Technologies Corporation, Tokyo (JP)

( * ) Notice: Subject to any disclaimer, the term of this patent is extended or adjusted under 35 U.S.C. 154(b) by 48 days.

(21) Appl. No.: 12/500,765

(22) Filed: Jul. 10, 2009

(65) Prior Publication Data
US 2010/0067135 A1  Mar. 18, 2010

(30) Foreign Application Priority Data
Aug. 25, 2008  (JP) ................ 2008-215483

(51) Int. Cl.
*G11B 27/36* (2006.01)
*G11B 5/09* (2006.01)
*G11B 5/596* (2006.01)

(52) U.S. Cl. ............ 360/31; 360/51; 360/77.08
(58) Field of Classification Search ......... None
See application file for complete search history.

(56) References Cited

U.S. PATENT DOCUMENTS
6,014,276 A * 1/2000 Takase ............ 360/49
6,760,170 B2 * 7/2004 Siew et al. ......... 360/31

FOREIGN PATENT DOCUMENTS
JP  2002-093088  3/2002

OTHER PUBLICATIONS
"Test System for Discrete Track Recording (DTR)", guzik product bulletin, No. 02-107507-04 (2009.2, Guzik Technical Enterprises.

* cited by examiner

*Primary Examiner* — Daniell L Negrón
(74) *Attorney, Agent, or Firm* — Antonelli, Terry, Stout & Kraus, LLP.

(57) ABSTRACT

The present invention is designed to support plural servo patterns by setting a portion of the information of the servo pattern as a detection pattern, comparing the demodulated pattern of the portion of the information with the detection pattern, and controlling an operation timing of a test according to a result of the comparison.

11 Claims, 5 Drawing Sheets

FIG. 4

| | | FIELD CORRESPONDING TO SSM | FIRST FIELD | SECOND FIELD | THIRD FIELD | | |
|---|---|---|---|---|---|---|---|
| 1 | A MAGNETIC DISC DRIVE | 01011 | 6-BIT TRACK ADDRESS | A | 6-BIT SECTOR ADDRESS | | |
| 2 | B MAGNETIC DISC DRIVE | 001001 | 7-BIT TRACK ADDRESS | 6-BIT SECTOR ADDRESS | B | | |
| 3 | C MAGNETIC DISC | 00100 | C | 7-BIT TRACK ADDRESS | 7-BIT SECTOR ADDRESS | | |

A, B, C ... : SERVO POSITION SIGNAL METHOD NAMES

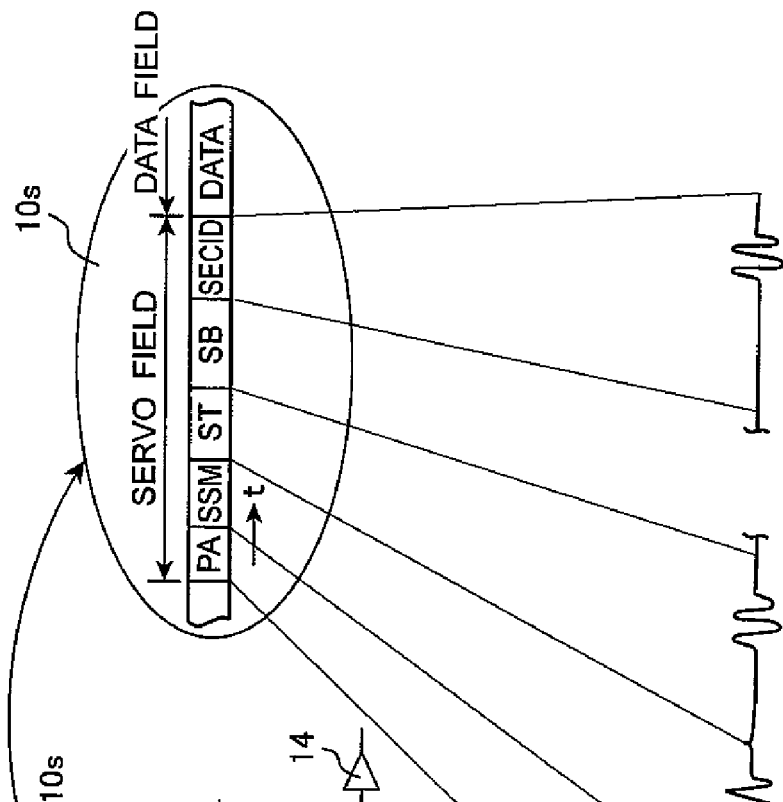
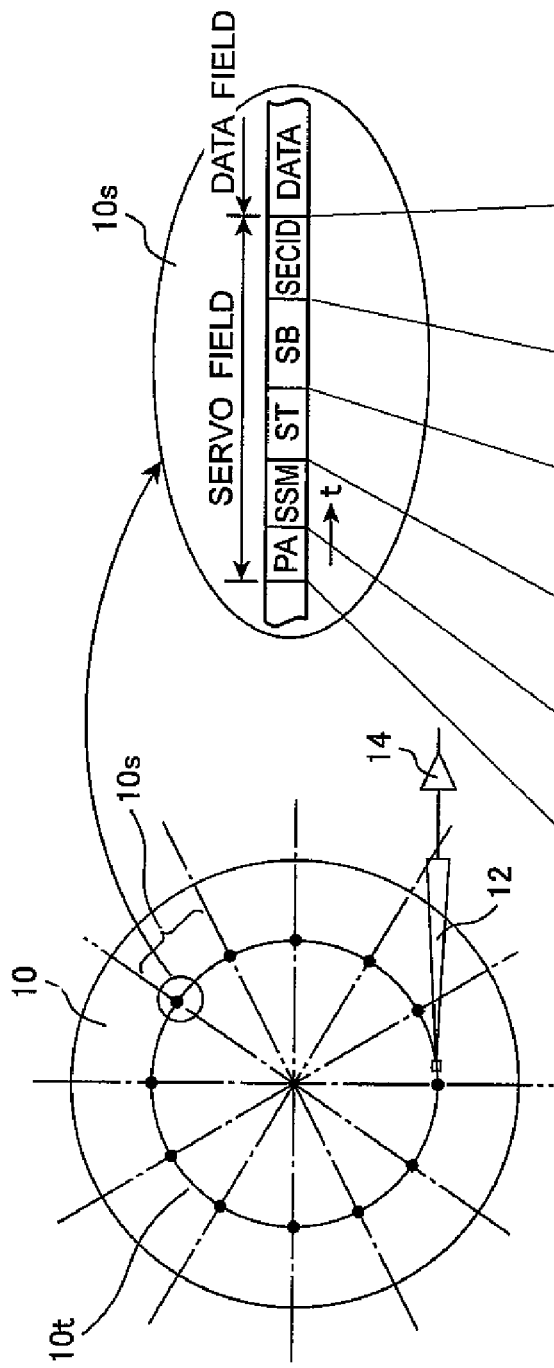
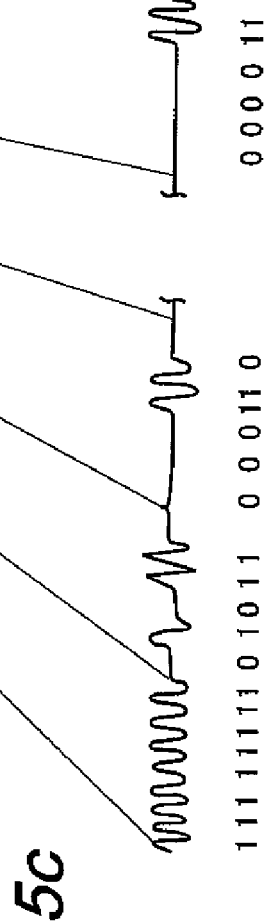

INSPECTION APPARATUS AND INSPECTION METHOD OF MAGNETIC DISK OR MAGNETIC HEAD

CLAIM OF PRIORITY

The present application claims priority from Japanese patent application serial No. JP 2008-215483, filed on Aug. 25, 2008, the content of which is hereby incorporated by reference into this application.

BACKGROUND OF THE INVENTION

The present invention relates to a magnetic head or magnetic disk testing apparatus and method (an inspection apparatus and inspection method of magnetic disk or magnetic head). More particularly, the present invention relates to a testing apparatus and testing method for enabling testing with different formats.

A magnetic head or magnetic disk testing apparatus is configured to determine the quality or other aspects of a magnetic head or a magnetic disk, by locating the magnetic head above the magnetic disk, writing and reading test data through the head on a target track, and measuring the characteristics of a signal read from the target track. As shown in FIG. 5, a magnetic disk 10 has plural data tracks 10t arranged in a radial direction. Each of the data tracks 10t has plural sectors 10s each having a servo field and a data field. Thus, track control should be performed in order to locate a magnetic head 12 on a target track to be tested. At the same time, servo control is also necessary to prevent track displacement due to the surface vibration, eccentricity, or other defects of the magnetic disk, from occurring in wiring (hereinafter referred to as W)/reading (hereinafter referred to as R) of data to/from the magnetic disk whose rotation is controlled.

In conventional testing apparatus, a signal corresponding to a servo field (hereinafter referred to as "servo pattern") is read by the magnetic head, in order to perform the above-described control by using a specific channel control IC corresponding to the servo pattern of the magnetic disk to be tested. For example, the details of the servo control in such a testing apparatus are disclosed in Patent document (Japanese Patent Application No. 3744781).

SUMMARY OF THE INVENTION

However, the servo pattern is different depending on the type of magnetic disk drive or magnetic disk. Servo control in a testing apparatus requires use of channel control ICs corresponding to various types of servo patterns. Thus, in order to support plural types of servo patterns in one testing apparatus, it is necessary to obtain channel control ICs corresponding to the different servo patterns, and to remodel the testing apparatus. This leads to an increase in the cost of the testing apparatus, resulting in an increase in the cost of the magnetic disk and magnetic head as well as the cost of the magnetic disk drive.

The present invention addresses the above identified problems by allowing one testing apparatus to support plural types of servo patterns, providing an inexpensive testing apparatus and a testing method.

The present invention is a magnetic head or magnetic recording medium testing apparatus or method for measuring characteristics of a magnetic head or a magnetic recording medium, by controlling the magnetic head and by writing/reading data to/from the magnetic recording medium, based on a servo pattern including position information on the magnetic recording medium as well as servo positioning information for positioning the magnetic head on a desired track. The magnetic head or magnetic medium testing apparatus or method sets a portion of the information of the servo pattern as a detection pattern, compares a demodulated pattern of the portion of the information with the detection pattern, and controls an operation timing of a test according to a result of the comparison.

A feature of the present invention is that the portion of the information is field information indicating the beginning of the servo pattern.

Another feature of the present invention is that the detection pattern is specified in advance.

Further, the present invention includes setting a servo position signal method to form the servo pattern based on the detection pattern, and demodulating a servo position signal by the set servo position signal method.

These and other objects, features and advantages of the invention will be apparent from the following more particular description of preferred embodiments of the invention, as illustrated in the companying drawings.

BRIEF DESCRIPTION OF THE DRAWINGS

FIG. 4 is a table showing servo patterns of magnetic disk drives and a magnetic disk magnetic head, according to a second embodiment of the present invention; and FIG. 5a is a view schematically illustrating a magnetic disk, FIG. 5b is a view showing an example of a sector format, and FIG. 5c is a view showing an example of a servo pattern.

DESCRIPTION OF THE PREFERRED EMBODIMENTS

Figure 1:
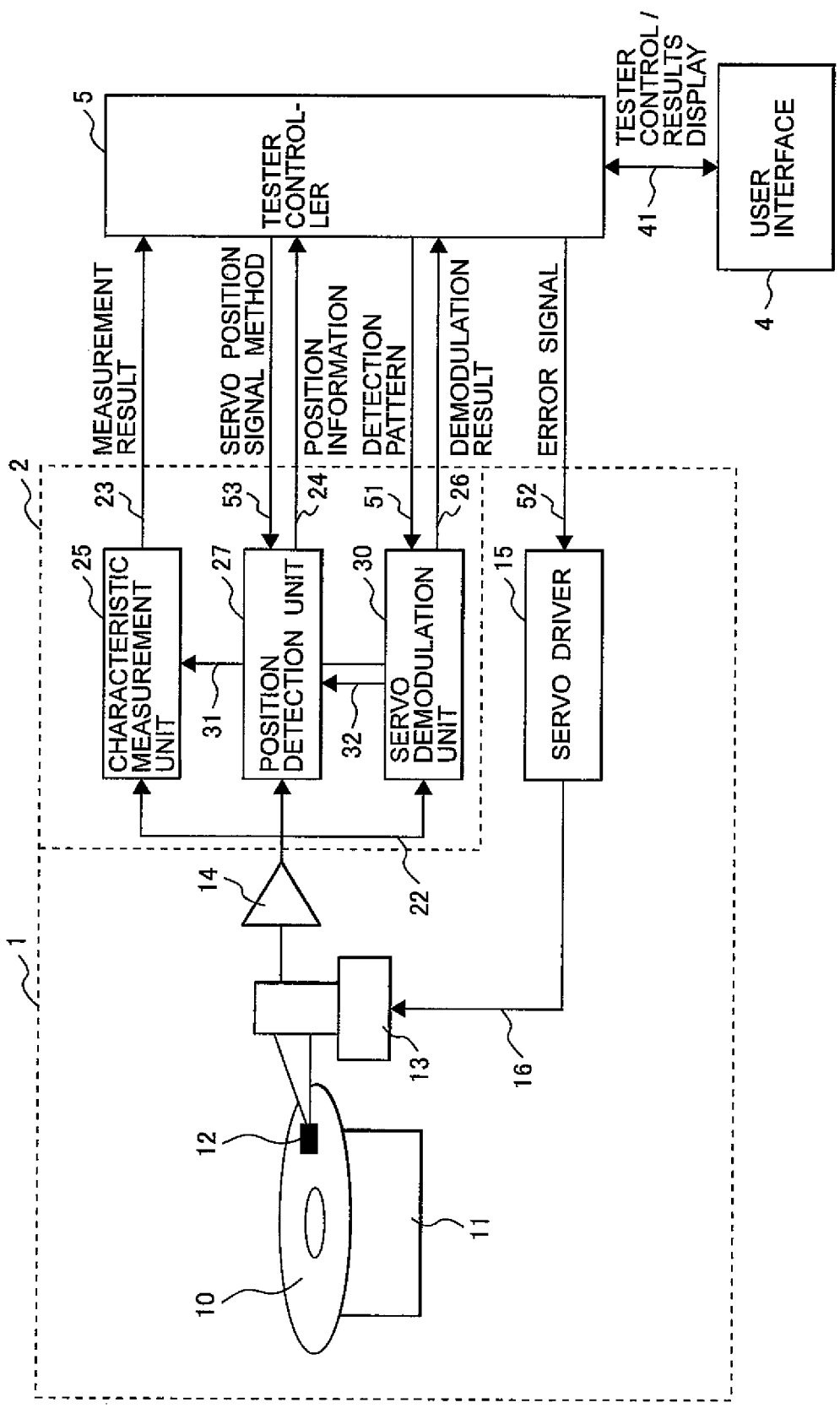
FIG. 1 is block diagram showing the configuration of a magnetic head or magnetic disk testing apparatus according to a first embodiment of the present invention.

As shown in FIG. 5a, a magnetic disk 10 has plural tracks 10t concentrically formed in a radial direction on the magnetic disk. Each of the tracks is divided into plural fields called servo sectors 10s. A servo field is provided at the beginning of the servo sector 10s. The rest of the servo sector 10s is designated to be used for actual data recording/reproduction as a data field. Such a segmentation is called sector format. A typical sector format is shown in FIG. 5b.

FIG. 5b shows an example of the sector format, in which the sector format is schematically illustrated as a line track in the horizontal direction. When the magnetic head 12 is positioned on the track 10t, a signal on the track 10t is read from left to right. Each servo sector includes the servo field and the data field. The servo field further includes the following subfields.

PA (Preamble Field) is a field providing preparation time until reading of the servo field in data R/W.

SSM (Servo Start Mark) is a marker field indicating the beginning of the servo field.

ST (Servo Track Field) is a field in which the track number is recorded.

SB (Servo Burst Field) is a field in which the servo position signal is recorded.

SECID (Sector Identification Field) is a field in which the sector number is recorded.

DATA (Data Field) is a field in which user data is recorded.

As described above, the servo pattern, which is a signal of the servo field formed by the order and data length of each of the above-described fields, differs depending on the type of magnetic disk drive or magnetic disk. For example, FIG. 5c shows a servo pattern longitudinally recorded in a magnetic disk. PA has a single frequency repeated for a certain period of time in order to indicate the beginning of the servo field. After PA, there follows SSM, ST, SECID, and the like, representing the data "1" meaning that a signal is present and the data "0" meaning that a signal is absent. In the example of FIG. 5c, SSM represents (01011), ST represents (000110), and SECID represents (000011). Here the data length of SSM is 5 bits, but may be 6 bits, and so on, in another magnetic disk drive or magnetic disk. Further, the servo position signal method of SB, which is the servo position signal field, includes several kinds of systems such as amplitude detection system and phase difference detection system.

The present invention focuses attention on a characteristic portion of the servo pattern of a magnetic disk drive or magnetic disk upon testing of the magnetic disk drive or magnetic disk. The focused portion is determined as a detection pattern. The magnetic disk drive or magnetic disk is tested based on the detection pattern. Particularly, SSM is the most appropriate for the focused portion at this time because, although the order of PA and SSM of the above-described fields is generally the same in different magnetic disk drives or magnetic disks, SSM has significant information and takes a constant value with respect to each magnetic disk drive or magnetic disk when compared to PA. Of course, this would not prevent the other fields from being used as the detection pattern.

The detection pattern may be given by a user from the magnetic disk drive or magnetic disk to be tested. It is also possible that the detection pattern is automatically selected from previously stored detection patterns by comparing them with the demodulated SSM bit pattern.

In the former case, the test is performed based on at least the detection pattern specified by the user. In this case, only the detection pattern may be specified, or data of all the other fields including SB, namely, the servo position signal method, may be specified in addition to the detection pattern. In the latter case, necessary detection patterns are previously prepared as a detection pattern data group. Each of the detection pattern data is compared with the demodulated data corresponding to the detection pattern. Then, the identical detection pattern of the detection pattern data group is determined as the detection pattern. In this way, the data formats of the other fields can be determined based on the determined detection pattern. For example, it is assumed that the detection pattern of A magnetic disk is 5-bit SSM with (01011), and the detection pattern of B magnetic disk is 6-bit SSM with (001001). In this case, when the demodulated SSM signal represents (01011), it is determined that the A magnetic disk is to be tested this time. The servo position signal method may be different even in the same magnetic head or magnetic disk. However, at least the SB field is identified, so that it is possible to determine the servo position signal method to be used, by processing the signal of the identified SB field by different methods. Once the method is determined, the determined method is used in the following processing.

Hereinafter preferred embodiments of the present invention will be described in detail with reference to the accompanying drawings. FIG. 1 shows the configuration of a magnetic head or magnetic disk testing apparatus (hereafter referred to as "testing apparatus") according to a first embodiment of the present invention, in which the detection pattern is specified by a user.

The testing apparatus in this embodiment roughly includes: a magnetic head driving unit 1; a signal processing unit 2 for processing a read signal 22 from the magnetic head driving unit 1; a signal writing unit (not shown) for writing a signal to the magnetic disk; a user interface 4 for allowing a user of the testing apparatus to specify the operation of the testing apparatus, and to display the test results; and a tester controller 5 for controlling these components, and transmitting and receiving signals.

The magnetic head driving unit 1 includes: a spin stand 11 for holding and rotating the magnetic disk 10; a R/W magnetic head 12 for writing and reading a signal to/from the magnetic disk 10; an R amplifier 14 for amplifying the read signal from the R/W magnetic head 12; a servo driver 15 for receiving an error signal 52, which is calculated in the tester controller 5 to indicate a difference between the actual track position of the R/W magnetic head 12 and a target track to be measured, and generating a stage control signal 16 based on the error signal 52; and a stage 13 for holding the R/W magnetic head 12 under the control of the servo driver 15.

The signal processing unit 2 roughly includes: a servo demodulation unit 30 for demodulating the servo pattern from the read signal 22 which is amplified in the R amplifier 14, and comparing a demodulation result 26 of the servo pattern with a detection pattern 51 determined by the tester controller 5, to identify the test target; a characteristic measurement unit 25 for detecting a predetermined characteristic from the read signal 22 in response to a timing signal 31 output from the servo demodulation unit 30, based on the servo pattern of the identified test target, and outputting a measurement result 23; and a position detection unit 27 for detecting position information 24 indicating the displacement of the R/W magnetic head 12 from the track, by the servo position signal method 53 specified by the tester controller 5, in response to a timing signal 32 output from the servo demodulation unit 30 in a similar manner to the timing signal 31.

Figure 2:
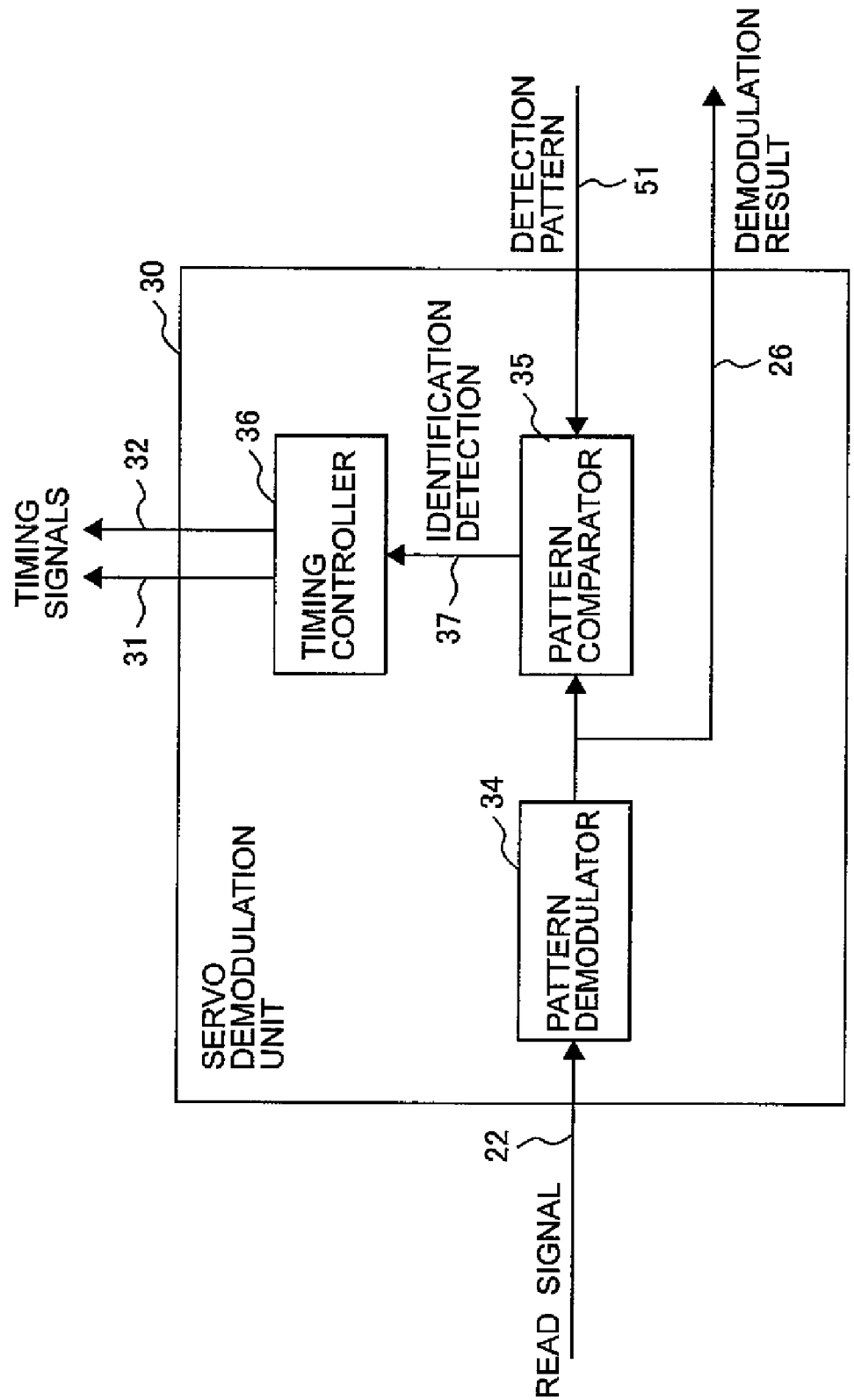
FIG. 2 is a block diagram showing a first example of a servo signal demodulation unit according to the first embodiment of the present invention.

FIG. 2 is a block diagram showing a first example of the servo demodulation unit 30 in this embodiment. A pattern demodulator 34 demodulates the SSM, ST, and SECID patterns to digital signal patterns based on the read signal 22 which is an analog signal. Then, the pattern demodulator 34 outputs the demodulation result 26 to the tester controller 5. A pattern comparator 35 compares the SSM pattern of the demodulation result 26, with the detection pattern 51 output from the tester controller 5. Then, the pattern comparator 35 outputs an identification detection signal 37. A timing controller 36 generates timing signals 32, 31 based on the identification detection signal 37. Then, the timing controller 36 outputs the timing signals 32, 31 to the position detection unit 27 and to the characteristic measurement unit 25, respectively, at a predetermined timing in order to control the operation start or operation period.

With the configuration described above, in the testing apparatus according to this embodiment, it is possible to provide servo control corresponding to the magnetic disk 10 by matching the detection pattern 51 set by the tester controller 5, to the servo pattern written in the magnetic disk 10.

Further, even in the case of using plural types of magnetic disks with different servo patterns, it is possible to support the plural types of magnetic disks in one testing apparatus by setting the detection pattern 51 corresponding to the servo pattern of each disc. It goes without saying that the detection pattern 51 is set or input by the user of the testing apparatus through the user interface 4 according to the servo pattern, and is generated by the tester controller 5 with a tester control signal 41.

Figure 3:
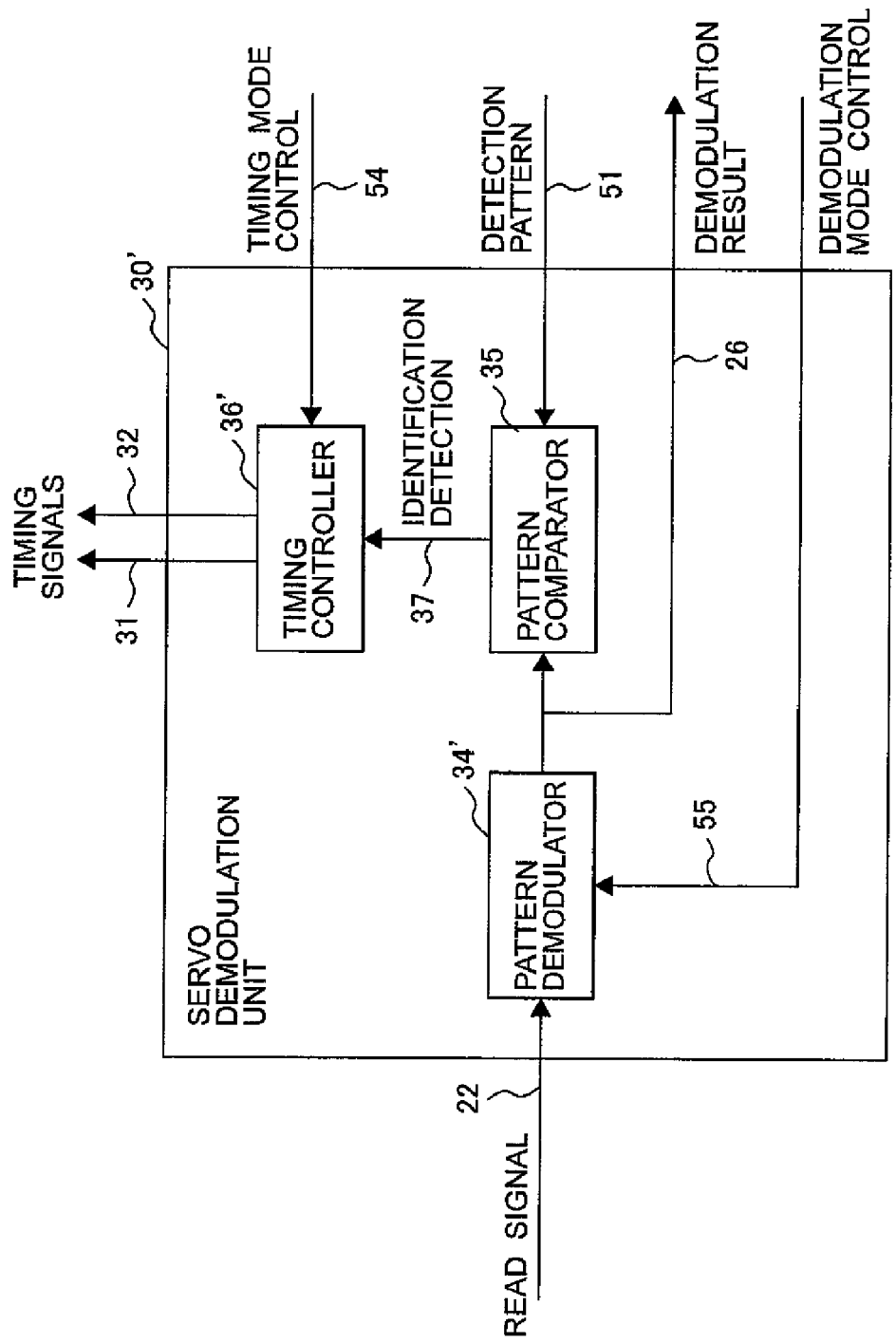
FIG. 3 is a block diagram showing a second example of the servo signal demodulation unit according to the first embodiment of the present invention.

Next, FIG. 3 shows the configuration of a second example 30' of the servo demodulation unit 30 in this embodiment. In addition to the configuration of the first example, the main features of the servo demodulation unit 30' are that a demodulation mode control signal 55 is input to a pattern demodulator 34', and a timing mode signal 54 is input to a timing controller 36'. The other components of the second example 30' are the same as those in the first example of the servo demodulation unit 30. Here, the demodulation mode control signal 55 and the timing mode control signal 54 are input from the tester controller 5 in a similar manner to the detection pattern 51. In the servo demodulation unit 30', the pattern demodulator 34' performs a predetermined demodulation operation in response to the read signal 22, according to the control of the demodulation mode control signal 55. In this way, the pattern demodulator 34' generates the demodulation result 26. The timing controller 36' provides variable control of the operation timings of the timing signals 31, 32 according to the control of the timing mode signal 54.

With the configuration described above, in the testing apparatus according to this embodiment, it is possible to provide servo control to plural types of discs with different servo patterns of different demodulation methods and position information timings, and with different data field timings.

Finally, a second embodiment will be described with reference to FIG. 4. The second embodiment is basically the same as the servo demodulation units 30 and 30' in the first embodiment. The difference between the first and second embodiments is that, as shown in FIG. 4, the tester controller 5 stores the servo patterns in the second embodiment. The order and data length of the track number recording field, the servo position signal field and the like after SSM, are different in each magnetic disk drive or magnetic disk. In addition, the address of the track number recording field is different depending on the magnetic disk drive or magnetic disk. Thus, in FIG. 4, the fields after SSM are referred to as first, second, and third fields. The address of SSM is also different depending on the magnetic disk driver or magnetic disk, however, this field still referred to as SSM herein. Of the servo patterns shown in FIG. 4, the SSM data which is the detection patterns and the SSM data in the demodulation result are compared with each other. In this way, the magnetic disk drive or magnetic disk to be tested is automatically determined. Once the test target is determined, the test is performed based on the determination result, by outputting the detection pattern or the demodulation mode control signal 55 to the servo demodulation unit 30 or 30', and outputting the timing mode control signal 54 to the timing controller.

It is also possible that the servo patterns in FIG. 4 are stored in the pattern demodulator 34 or 34', and the test target is determined by the pattern demodulator 34 or 34'. In this case, the detection pattern signal 51, demodulation mode control signal 55, and timing mode control signal 54 are not output from the tester controller 5.

According to the above-described embodiment, it is possible to test the magnetic head or magnetic disk by automatically detecting the servo pattern without the user specifying it.

While the invention made by the present inventors has been described in detail with reference to the preferred embodiments, it will be appreciated that the present invention is not limited to the embodiments described above and various modifications and changes may be made thereto without departing from the spirit and scope of the invention.

According to the present invention, it is possible to provide servo control corresponding to plural types of magnetic disks, without obtaining plural types of channel control ICs, and without remodeling the testing apparatus. Thus, the present invention can be applied to the magnetic head or magnetic disk testing apparatus, allowing for highly accurate servo control of a magnetic disk with high-density information storage capacity.

According to the present invention, in the magnetic head or magnetic disk testing apparatus, it is possible to provide servo control corresponding to an arbitrary servo pattern in plural types of magnetic disks, without remodeling the testing apparatus. As a result, the cost of the testing apparatus can be reduced.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic head or magnetic disk testing apparatus for measuring characteristics of a magnetic head or a magnetic recording medium, by controlling the magnetic head and by writing/reading data to/from the magnetic recording medium, based on a servo pattern including position information on the magnetic recording medium as well as servo positioning information for positioning the magnetic head on a desired track, the magnetic head or magnetic disk testing apparatus comprising:

means for setting a portion of the information of the servo pattern as a detection pattern;

means for comparing a demodulated pattern of the portion of the information with the detection pattern; and a timing control means for controlling an operation timing of a test according to a result of the comparison;

wherein the portion of the information is field information indicating the beginning of the servo pattern; and wherein the setting means selects from a plurality of detection patterns based on the demodulated pattern of the portion of the information.

2. The magnetic head or magnetic disk testing apparatus according to claim 1, wherein the portion of the information is configured to be set arbitrarily.

3. The magnetic head or magnetic disk testing apparatus according to claim 1, wherein the setting means uses the detection pattern that is specified in advance.

4. The magnetic head or magnetic disk testing apparatus according to claim 3, further comprising:

means for setting a servo position signal method to form the servo pattern based on the detection pattern, and means for demodulating a servo position signal read from a magnetic head driving unit.

5. The magnetic head or magnetic disk testing apparatus according to claim 4, wherein the servo position signal method setting means sets from a plurality of predetermined servo position signal methods.

6. The magnetic head or magnetic disk testing apparatus according to claim 1, further comprising:

means for setting a servo position signal method to form the servo pattern based on the detection pattern, and means for demodulating a servo position signal read from a magnetic head driving unit.

7. The magnetic head or magnetic disk testing apparatus according to claim 6, wherein the servo position signal method setting means sets from a plurality of predetermined servo position signal methods.

8. A magnetic head or magnetic disk testing method for measuring characteristics of a magnetic head or a magnetic recording medium, by controlling the magnetic head and by writing/reading data to/from the magnetic recording medium, based on a servo pattern including position information on the magnetic recording medium as well as servo positioning information for positioning the magnetic head on a desired track, the magnetic head or magnetic disk testing method comprising the steps of:

setting a portion of the information of the servo pattern as a detection pattern;

comparing a demodulated pattern of the portion of the information with the detection pattern; and controlling an operation timing of a test according to a result of the comparison;

wherein the portion of the information is field information indicating the beginning of the servo pattern; and wherein the setting step selects from a plurality of detection patterns based on the demodulated pattern of the portion of the information.

9. The magnetic head or magnetic disk testing method according to claim 8, wherein the portion of the information is field information indicating the beginning of the servo pattern.

10. The magnetic head or magnetic disk testing method according to claim 9, wherein the detection pattern is specified in advance.

11. The magnetic head or magnetic disk testing method according to claim 10, further comprising the steps of:

setting a servo position signal method to form the servo pattern based on the detection pattern; and demodulating a servo position signal read from a magnetic head driving unit.

* * * * *